United States Patent [19]

Hiraiwa

[11] E Patent Number: Re. 32,565

[45] Reissued Date of Patent: Dec. 22, 1987

[54] FOUR-WHEEL VEHICLE DRIVE SYSTEM

[75] Inventor: Kazuyoshi Hiraiwa, Atsugi, Japan

[73] Assignee: Nissan Motor Company, Limited, Japan

[21] Appl. No.: 850,151

[22] Filed: Apr. 10, 1986

Related U.S. Patent Documents

Reissue of:

[64] Patent No.: 4,476,953
Issued: Oct. 16, 1984
Appl. No.: 411,814
Filed: Aug. 26, 1982

[30] Foreign Application Priority Data

Oct. 12, 1981 [JP] Japan ..... 56-162355

[51] Int. Cl.[4] ..... B60K 5/04; B60K 17/34

[52] U.S. Cl. ..... 180/249; 180/247

[58] Field of Search ..... 180/249, 247, 233, 297; 74/710.5, 714, 740

[56] References Cited

U.S. PATENT DOCUMENTS

| | | | |
|---|---|---|---|
| 4,415,058 | 11/1983 | Suzuki | 180/247 |
| 4,417,642 | 11/1983 | Suzuki et al. | 180/249 |
| 4,420,059 | 12/1983 | Suzuki | 180/248 |
| 4,428,452 | 1/1984 | Moraoka et al. | 180/249 |
| 4,431,079 | 2/1984 | Suzuki | 180/247 |
| 4,449,604 | 5/1984 | Suzuki | 180/233 |
| 4,457,394 | 7/1984 | Suzuki | 180/247 |

FOREIGN PATENT DOCUMENTS

| | | |
|---|---|---|
| 11948 | 1/1980 | Japan . |
| 17727 | 2/1980 | Japan . |
| 83119 | 6/1980 | Japan . |

*Primary Examiner*—John J. Love
*Assistant Examiner*—Donn McGiehan
*Attorney, Agent, or Firm*—Lane and Aitken

[57] ABSTRACT

A four-wheel vehicle drive system comprising an engine having an output shaft in a lateral direction of the vehicle, a power transmission gear unit including input and output shafts in lateral directions of the vehicle, a final reduction gear rotatable about an axis parallel with the transmission input and output shafts and adapted to be driven by the transmission output shaft, a main transaxle casing having enclosed therein the transmission gear unit and final reduction gear, an auxiliary transaxle casing secured to the main transaxle casing, a central differential gear assembly enclosed within the main transaxle casing and including a differential gear housing rotatable with the final reduction gear and two output members enclosed within the different gear housing and rotatable at different speeds, a first wheel drive gear unit enclosed within the auxiliary transaxle casing and comprising a differential gear assembly connected to a one pair of road wheels and including an input member rotatable with one of the two output members of the central differential gear assembly, intermediate gear means including an input gear rotatable with the other of the two output members, a second wheel drive gear unit comprising a differential gear assembly connected to another pair of road wheels, and right-angle power transfer gear means to transmit driving power from the intermediate gear means to the second wheel drive gear unit in a fore-and-aft direction of the vehicle.

10 Claims, 2 Drawing Figures

FOUR-WHEEL VEHICLE DRIVE SYSTEM

Matter enclosed in heavy brackets [ ] appears in the original patent but forms no part of this reissue specification; matter printed in italics indicates the additions made by reissue.

FIELD OF THE INVENTION

The present invention relates to a four-wheel drive system for an automative vehicle having at least two pairs of road wheels consisting of a pair of front road wheels and a pair of rear road wheels and, more particularly, to a transaxle mechanism for use in a four-wheel drive system for such a wheeled vehicle.

DESCRIPTION OF THE PRIOR ART

In an automotive vehicle equipped with a four-wheel drive system, it is desired to provide not only clutch and transmission gear units but a central differential gear assembly to take up a differential speed of rotation between the front and rear road wheels of the vehicle during, for example, turning of the vehicle. Whereas, a four-wheel drive system is known which is of the type using a power plant positioned to have an axis of rotation in a lateral direction of the vehicle body. Typical examples of such a four-wheel drive system are disclosed in, for example, Japanese Provisional Publications of Patent No. 55-11948 and No. 55-17727. The prior-art four-wheel drive system therein shown is, however, not provided with a central differential gear assembly of the above described nature. If a transaxle mechanism having incorporated therein a power transmission gear unit and a final reduction gear for use in a two-wheel drive system is to be modified to construct a transaxle mechanism for a four-wheel drive system, either a central differential gear assembly could not be incorporated into such a transaxle mechanism or the transaxle mechanism must be widely modified and/or reconstructed for incorporation of a central differential gear assembly therein. This spoils the potential adaptability of a four-wheel drive system or requires a large amount of investment for the production of four-wheel drive systems on a commercial basis.

The present invention contemplates elimination of these drawbacks of known four-wheel drive systems of the described characters. It is, accordingly, a prime object of the present invention to provide a four-wheel drive system which includes a transaxle mechanism having a central differential gear assembly incorporated therein and which can be constructed by slightly modifying a transaxle mechanism originally designed for use in a two-wheel drive system of an automotive vehicle.

SUMMARY OF THE INVENTION

In accordance with the present invention, there is provided a four-wheel drive system for a vehicle with first and second pairs of road wheels, comprising a power unit having an output shaft rotatable about an axis in a lateral direction of the vehicle; a power transmission gear unit including transmission input and output shaft each having an axis of rotation in a lateral direction of the vehicle; a final reduction gear rotatable about an axis parallel with the respective axes of rotation of the transmission input and output shafts, the transmission output shaft being held in driving engagement with the final reduction gear; a main transaxle gear casing having enclosed therein the transmission gear unit, the final reduction gear and the gear housing; an auxiliary transaxle gear casing secured to the main transaxle gear casing; a central differential gear assembly enclosed within the main transaxle gear casing and including a differential gear housing coaxially rotatable with the final reduction gear about the axis of rotation of the final reduction gear and two output members enclosed within the differential gear housing and rotatable at different speeds about axes substantially aligned with the axis of rotation of the differential gear housing; a first wheel drive gear unit enclosed within the auxiliary transaxle gear casing and comprising a differential gear assembly operatively connected to the first pair of road wheels of the vehicle and including an input member rotatable with one of the two output members of the central differential gear assembly about an axis in a lateral direction of the vehicle; intermediate gear means enclosed within the auxiliary transaxle gear casing and including an input gear rotatable with the other of the two output members of the central differential gear assembly about an axis substantially aligned with the axis of rotation of the output member of the central differential gear assembly; a second wheel drive gear unit comprising a differential gear assembly operatively connected to the second pair of road wheels of the vehicle; and right-angle power transfer gear means enclosed within the auxiliary transaxle gear casing and operative to transmit driving power from the intermediate gear means to the differential gear assembly of the second wheel drive gear unit in a fore-and-aft direction of the vehicle. In the four-wheel drive system thus constructed and arranged, the first wheel drive gear unit may further comprise a lock-up clutch assembly operatively intervening between the two output members of the central differential gear assembly and operable for having the two output members locked up to each other and enable to rotate at substantially equal speeds about the axis of rotation of the differential gear housing.

DESCRIPTION OF THE DRAWINGS

The features and advantages of a transaxle mechanism of a four-wheel drive system proposed by the present invention will be more clearly understood from the following description take in conjunction with the accompanying drawings in which.

DESCRIPTION OF THE PREFERRED EMBODIMENT

Figure 1:
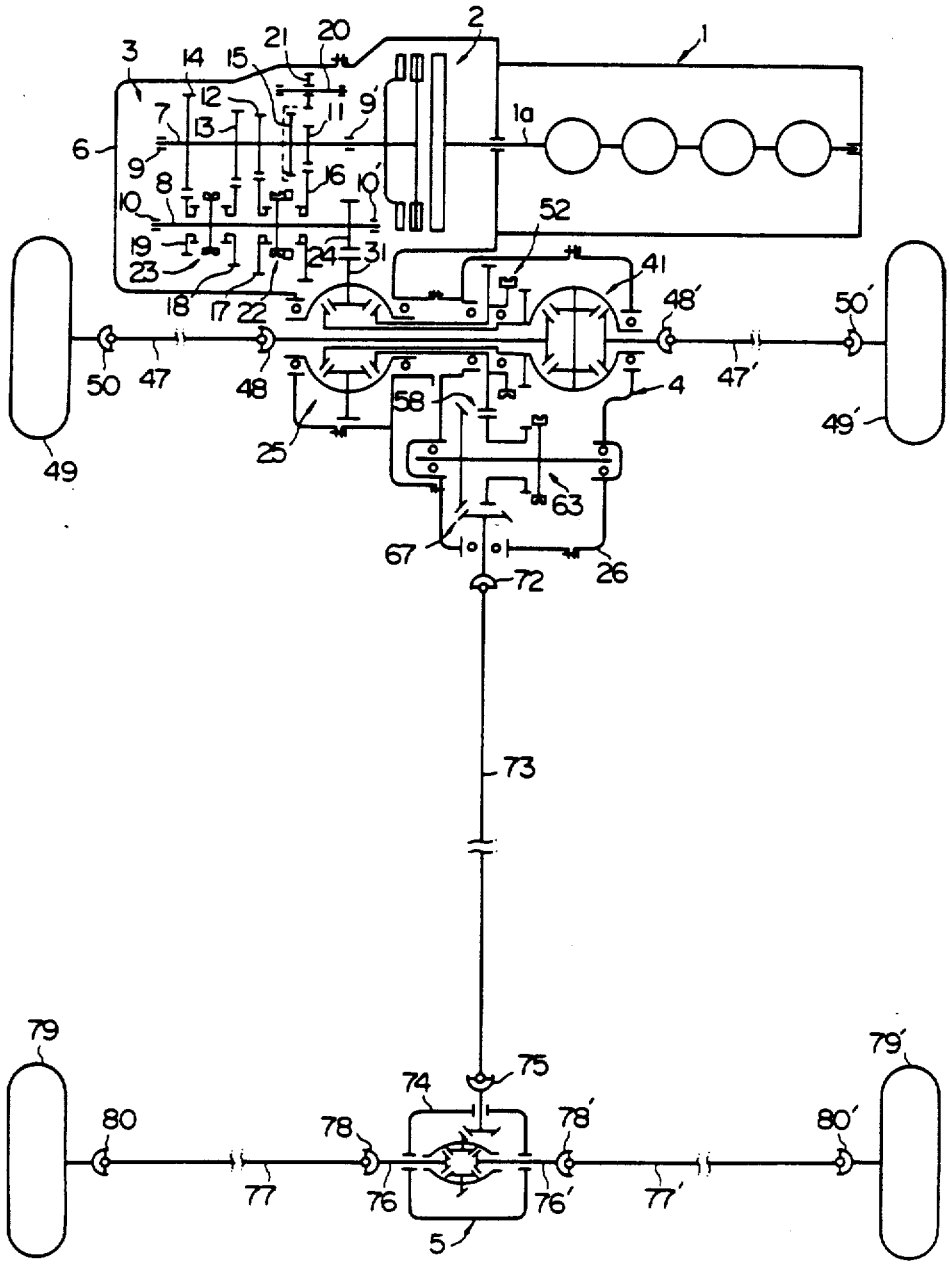
FIG. 1 is a schematic plan view showing a preferred embodiment of a four-wheel drive system according to the present invention.

Referring to the drawings, a four-wheel drive system embodying the present invention comprises a transaxle mechanism in combination with a power unit typically constituted by an internal combustion engine which is schematically indicated at 1 in FIG. 1. The internal combustion engine 1 has a power output shaft 1a which is constituted by, for example, the crankshaft of an ordinary internal combustion engine for automotive use. The four-wheel drive system proposed by the present invention is to be used in a vehicle having the engine positioned laterally of the vehicle body. The engine 1 is thus installed on the body structure (not shown) of a wheeled vehicle in such a manner that the output shaft 1a extends in a lateral direction of the vehicle body. The four-wheel drive system embodying the present invention is further assumed as being incorporated in an automotive vehicle of the front engine design and, thus, the engine 1 is positioned in a front portion of the vehicle body. As is further shown in FIG. 1 of the drawings, such a four-wheel drive system includes a transaxle mechanism comprising a clutch unit 2, a power transmission gear unit 3, and a front-wheel drive gear unit 4 as schematically shown in FIG. 1. In the embodiment of the present invention as herein shown, it is assumed that the clutch unit 2 is of the friction-disc type and that the power transmission gear unit 3 is of the manually operated synchromesh type. The clutch unit 2, power transmission gear unit 3 and front-wheel drive gear unit 4 thus constituting the transaxle mechanism of the drive system embodying the present invention are enclosed within a common transaxle casing structure which is fixedly mounted on the vehicle body. The four-wheel drive system embodying the present invention further comprises a rear-wheel drive gear unit 5 as also schematically shown in FIG. 1.

The power transmission gear unit 3 is, more specifically, enclosed within a main transaxle gear casing 6 forming part of the above mentioned transaxle casing structure and comprises input and output shafts 7 and 8. The transmission input shaft 7 has opposite end portions respectively journaled in bearings 9 and 9' received in the transaxle gear casing 6 and axially extends in alignment with the axis of rotation of the engine output shaft 1a. The transmission output shaft 8 likewise has opposite end portions respectively journaled in bearings 10 and 10' received in the transaxle gear casing 6 and axially extends in parallel with the transmission input shaft 7. The transmission input shaft 7 is selectively coupled to and uncoupled from the engine output shaft 1a through the clutch unit 2. The transmission gear unit 3 is assumed to be of the four-forward-speed and one-reverse-speed type and thus comprises five input gears coaxially rotatable with the transmission input shaft 7 and consisting of first-speed and fourth-speed forward drive gears 11 to 14, and a reverse drive gear 15. On the other hand, the transmission output shaft 8 has mounted thereon four driven gears coaxially rotatable independently of one another on the shaft 8 and consisting of first-speed to fourth-speed driven gears 16 to 19. The gears 16 to 19 are held in mesh with the drive gears 11 to 14, respectively, on the transmission input shaft 7. The transmission gear unit 3 further comprises a reverse idler shaft 20 having an idler gear 21 coaxially rotatable thereon and axially movable on the shaft 20 into and out of an axial position to be held in mesh with the reverse drive gear 15 on the transmission input shaft 7 as indicated by broken lines in FIG. 1. The reverse idler shaft 20 also extends in parallel with the transmission input shaft 7 and has opposite end portions secured to the main transaxle gear casing 6.

The transmission gear unit 3 further comprises first-second and third-fourth speed synchronizer clutch assemblies 22 and 23, each of which is coaxially rotatable with the transmission output shaft 8. The first-second speed synchronizer clutch assembly 22 is provided between the first-speed and second-speed driven gears 16 and 17 and is selectively engageable with these gears 16 and 17. Likewise, the third-fourth speed synchronizer clutch assembly 23 is provided between the third-speed and fourth-speed driven gears 18 and 19 and is selectively engageable with the gears 18 and 19. The transmission output shaft 8 has fixedly mounted thereon a transmission output gear 24.

Figure 2:
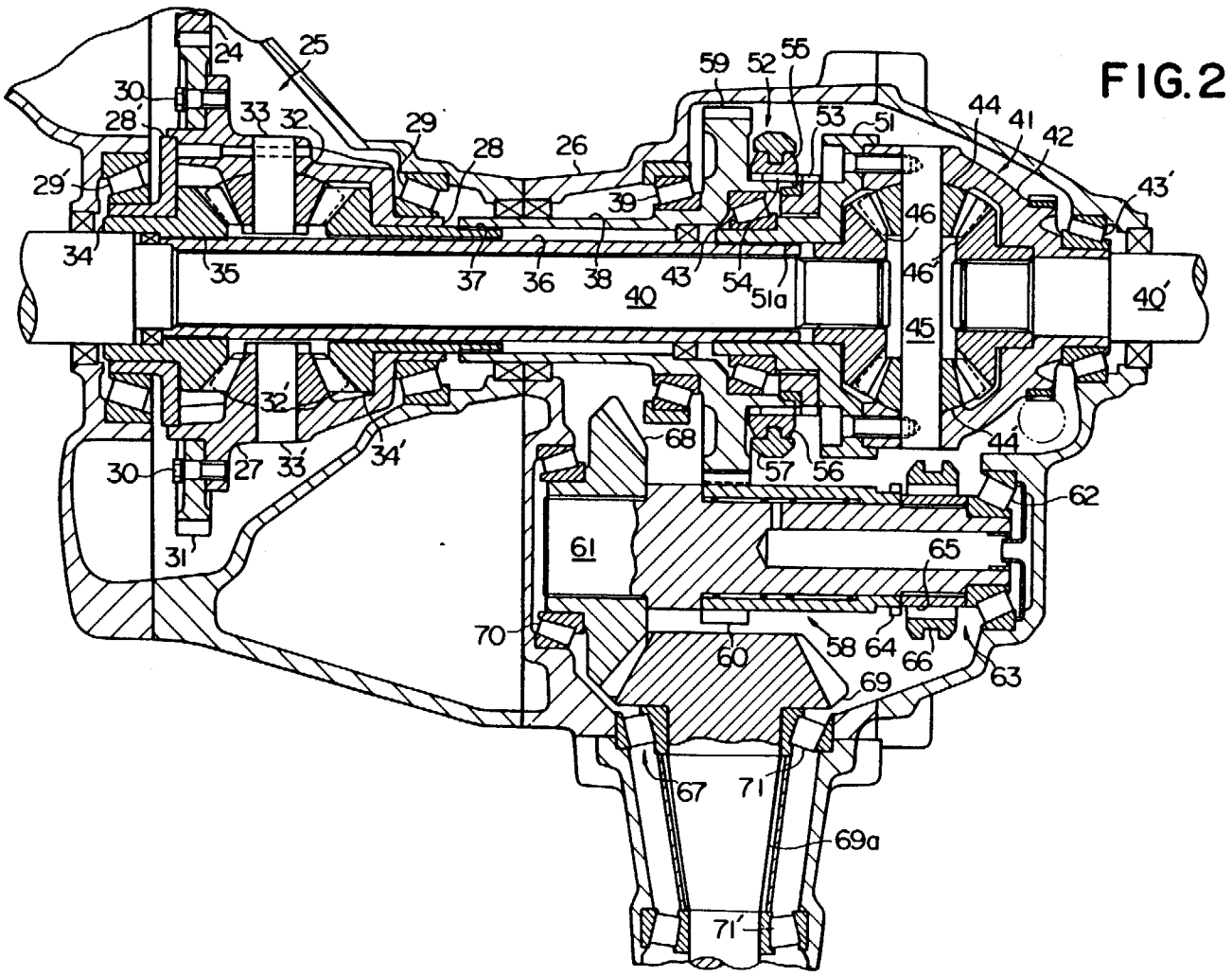
FIG. 2 is a sectional view of the transaxle mechanism forming part of the four-wheel drive system shown in FIG. 1.

As will be better seen from FIG. 2 of the drawings, the main transaxle gear casing 6 has further enclosed therein a central differential gear assembly 25 as well as the above described clutch unit 2 and transmission gear unit 3 and is securely connected to an auxiliary transaxle gear casing 26. In the shown embodiment of the present invention, the central differential gear assembly 25 comprises a gear housing 27 which is rotatable about an axis directed laterally of the vehicle body, viz., parallel with the axis of rotation of the transmission output shaft 8. The differential gear housing 27 has a cylindrical boss portion 28 rotatably supported in the main transaxle gear casing 6 by means of a bearing 29 received in the gear casing 6 and is secured at its end opposite to the boss portion 28 to a hub member 28' rotatably supported in the gear casing 6 by means of a bearing 29' received in the gear casing 6. The differential gear housing 27 is coaxially secured by suitable fastening means such as bolts 30 to a final reduction gear 31 which is held in mesh with the above mentioned transmission output gear 24. The gear housing 27 thus serves as an input member of the differential gear assembly 25 and has carried therein a pair of differential bevel pinions 32 and 32' rotatably mounted on split pinion cross shafts 33 and 33', respectively, which are secured to the gear housing 27 and which axially extend in alignment with each other at right angles to the axis of rotation of the gear housing 27. The beveled pinions 32 and 32' are, thus, rotatable not only together with the gear housing 27 and the pinion cross shafts 33 and 33' about the axis of rotation of the gear housing 27 but also independently of one another about the aligned center axes of the cross shafts 33 and 33', viz., about an axis perpendicular to the axis of rotation of the gear housing. The differential bevel pinions 32 and 32' are disposed between and are held in mesh with axially bored first and second differential side bevel gears 34 and 34' which respectively constitute two output members of the differential gear assembly 25. The side bevel gears 34 and 34' are also carried in the differential gear housing 27 and are rotatable about the axis of rotation of the gear housing 27. The first side bevel gear 34 has a serrated inner peripheral wall portion as indicated at 35 and is internally splined to an externally serrated axial end portion of a first hollow shaft 36 which has a center axis partially coincident with the respective center axes of the side bevel gears 34 and 34' and which axially extends through the bores in the bevel gears 34 and 34' into the auxiliary transaxle gear casing 26 as shown. The first hollow shaft 36 is thus rotatable with respect to the main and auxiliary transaxle gear casings 6 and 26 and to the differential gear housing 27 about the axis of rotation of the gear housing 27. On the other hand, the second side bevel gear 34' has a cylindrical boss portion axially extending opposite to the first side bevel gear 34 through the boss portion 28 of the differential gear housing 27 and having the first hollow shaft 36 axially passed therethrough. The cylindrical boss portion of the side bevel gear 34' is externally serrated as indicated at 37 and is splined to an internally serrated axial portion of a second hollow shaft 38 having a center axis coincident with a portion of the center axis of the first hollow shaft 36 and axially extending around the first hollow shaft 36. The second hollow shaft 38 is rotatably supported in the axuiliary transaxle gear casing 26 by means of a beariang 39 received in the gear casing 26 and is thus rotatable with respect to the main and auxiliary transaxle gear casings 6 and 26 and the differential gear housing 27 and further to the first hollow shaft 36 about an extension of the axis of rotation of the differential gear housing 27, vis., about the axis of rotation of the first hollow shaft 36.

The front-wheel drive gear unit 4 of the four-wheel drive system embodying the present invention further comprises a pair of front side gear shafts 40 and 40' having respective axes of rotation aligned with the axes of rotation of the above described first and second hollow shafts 36 and 38 and thus parallel with the input and output shafts 7 and 8 of the transmission gear unit 3 (FIG. 1). One front side gear shaft 40 has an inner axial portion extending through the first hollow shaft 36 and the other front side gear shaft 40' extends opposite to the side gear shaft 40 outwardly from the auxiliary transaxle gear casing 26. As will be seen from FIG. 2, the side gear shafts 40 and 40' have externally serrated inner end portions and axially extend in opposite directions laterally of the vehicle body from a front-wheel differential gear assembly 41 which forms part of the front-wheel drive gear unit 4.

The front-wheel differential gear assembly 41 is also enclosed within the auxiliary transaxle gear casing 26 and comprises a gear housing 42 which is rotatable about an axis aligned with the axes of rotation of the side gear shafts 40 and 40'. The gear housing 42 constitutes an input member of the differential gear assembly 41 and is rotatably supported in the transaxle gear casing 26 respectively by means of bearings 43 and 43'. The gear housing 42 has carried therein a pair of differential bevel pinions 44 and 44' which are rotatably mounted on a common pinion cross shaft 45 secured to the gear housing 42 and extending at right angles to the axis of rotation of the gear housing 42. The individual bevel pinions 44 and 44' are, thus, rotatable not only together with the gear housing 42 and the cross shaft 45 about the axis of rotation of the gear housing 42 but also independently of one another about the center axis of the cross shaft 45, viz., about an axis perpendicular to the axis of rotation of the gear housing 42. The differential bevel pinions 44 and 44' are disposed between and are held in mesh with a pair of differential side bevel gears 46 and 46' which are also carried in the differential gear housing 42 and which are rotatable about the axis of rotation of the gear housing 42. The side bevel gears 46 and 46' constitute power output members of the differential gear assembly 41 and are fixedly connected to or splined to the serrated inner end portions of the side gear shafts 40 and 40', respectively, which extend outwardly from the gear housing 42 in a lateral direction of the vehicle body. One side gear shaft 40 extends outwardly from the gear housing 42 and in part through the hollow shaft 36 and the other side gear shaft 40' extends outwardly from the gear housing 42 in the opposite direction to the side gear shaft 40. The front side gear shafts 40 and 40' form part of front axle assemblies and are operatively connected at their axially outer ends to front wheel drive shafts 47 and 47' through suitable coupling means such as constant-velocity or universal coupling units 48 and 48', respectively, as shown in FIG. 1. The front wheel drive shafts 47 and 47' also extend in a lateral direction of the vehicle body and are in turn connected at their outer axial ends to the front wheel axles for front road wheels 49 and 49' via suitable coupling means such as constant-velocity or universal coupling units 50 and 50', respectively. The differential gear housing 42 has securely attached thereto a hub member 51 by suitable fastening means such as bolts as shown. The hub member 51 has a cylindrical axial portion coaxially surrounding an inner axial end portion of the first hollow shaft 36 and rotatably received in the second hollow shaft 38 by means of the bearing 43 as shown. The cylindrical axial portion of the hub member 51 is internally serrated and is splined to the externally serrated inner axial end portion of the first hollow shaft 36 as indicated at 51a.

The front-wheel drive gear unit 4 comprises, in addition to the above described differential gear assembly 41, a lock-up clutch assembly 52 enclosed within the auxiliary transaxle gear casing 26. The lock-up clutch assembly 52 is adapted to have the first and second hollow shafts 36 and 38 selectively coupled to and uncoupled from each other and comprises externally serrated first and second clutch gears 53 and 54. The first clutch gear 53 is secured or splined to or integral with the hub member 51 secured to the differential gear housing 42 as above described and is, accordingly, coaxially rotatable with the first hollow shaft 36 and the differential gear housing 42 about the axis of rotation of the side gear shaft 40. On the other hand, the second clutch gear 54 is integral with or secured or splined to the second hollow shaft 38 and is thus coaxially rotatable with the second hollow shaft 38 also about the axis of rotation of the side gear shaft 40. One of the first and second clutch gears 53 and 54 such as the second clutch gear 54 has splined thereto an internally serrated, annular coupling sleeve 56. The coupling sleeve 56 is axially movable on the second clutch gear 54 into and out of engagement with the first clutch gear 53. The coupling sleeve 56 is formed with an external circumferential groove having fitted therein a clutch actuating fork 57. The clutch actuating fork 57 is connected through a suitable mechanical linkage to manually or otherwise operated lock-up control means (not shown) so that the coupling sleeve 56 is axially moved selectively into or out of engagement with the first clutch gear 53.

Within the auxiliary transaxle casing 26 is further enclosed an intermediate gear mechanism or means 58 which is operative to transmit driving power from the second hollow shaft 38 to the rear-wheel driveline. In the shown embodiment of a four-wheel drive system according to the present invention, such a gear mechanism 58 comprises a first intermediate gear 59 which is constituted by a portion of or otherwise coaxially rotatable with the second hollow shaft 38, and a second intermediate gear 60 which is coaxially rotatable on an intermediate gear shaft 61 and which is held in mesh with the first intermediate gear 59. The first intermediate gear 59 is thus rotatable with the side bevel gear 34' of the central differential gear assembly 25 about an axis substantially aligned with the axis of rotation of the side bevel gear 34'. The intermediate gear shaft 61 is rotatable with respect to the transaxle casing 26 about an axis parallel with the side gear shaft 40 and has an axial end portion journaled in a bearing 62 received in the transaxle gear casing 26. The first and second intermediate gears 59 and 60 constitute input and output gears, respectively, of the intermediate gear mechanism 58.

The four-wheel drive system embodying the present invention further comprises a two-wheel/four wheel drive shift gear assembly 63 adapted to selectively establish or cut off driving connection from the second hollow shaft 38 to the rear-wheel driveline. The gear assembly 63 comprises at least three clutch members consisting of a first clutch member coaxially rotatable with the second intermediate gear 60, a second clutch member held in driving connection to the rear wheel driveline and coaxially rotatable with, for example, the intermediate gear shaft 61, and a third clutch member coaxially rotatable with one of the first and second clutch members and selectively movable into and out of engagement with the other of the first and second clutch members. In the embodiment herein shown, the first clutch member is constituted by a first clutch gear 64 integral with or secured or splined to the second intermediate gear 60 and accordingly coaxially rotatable with the intermediate gear 60 on the intermediate gear shaft 61. On the other hand, the second clutch member is constituted by an externally serrated annular second clutch gear 65 securely mounted on or splined to an axial end portion of the intermediate gear shaft 61 and thus coaxially rotatable with the shaft 61. The third clutch member of the two-wheel/four-wheel drive shifting gear assembly 63 is constituted by an internally serrated, annular coupling sleeve 66 which is splined to the second clutch gear 65. The coupling sleeve 66 is axially movable on the serrated annular clutch gear 65 selectively into and out of engagement with the serrated annular portion of the clutch gear 64. The coupling sleeve 66 is formed with an external circumferential groove having fitted therein a clutch actuating fork (not shown). Though not shown in the drawings, the clutch actuating fork is connected through a suitable mechanical linkage to manually or otherwise operated two-wheel/four-wheel drive shift control means so that the coupling sleeve 66 is axially moved selectively into or out of engagement with the clutch gear 64.

The rear-wheel drive gear unit 5 further comprises a right-angle power transfer gear mechanism 67 which is enclosed within the auxiliary transaxle gear casing 26 and which is operatively connected through a rear wheel driveline to the wheel axles for the rear road wheels. The right-angle power transfer gear mechanism 67 essentially consists of the combination of a driving bevel gear 68 and a driven bevel gear 69. The driving bevel gear 68 has a boss portion journaled in a bearing 70 received in the auxiliary transaxle gear casing 26 and is splined to and accordingly coaxially rotatable with the intermediate gear shaft 61. The driven bevel gear 69 is held in mesh with the driving bevel gear 68 and is rotatable about an axis perpendicular to the axis of rotation of the intermediate gear shaft 61, viz., about an axis in a fore-and-aft direction of the vehicle body. The driven bevel gear 69 has a rearward axial extension 69a journaled in bearings 71 and 71' received in the auxiliary transaxle gear casing 26.

The axial extension 69a of the driven bevel gear 69 projects rearwardly from the gear casing 26 and is connected through a suitable joint unit such as a constant-velocity or universal coupling unit 72 to a propeller shaft 73 extending rearwardly from the coupling unit 72 in a fore-and-aft direction of the vehicle body as shown in FIG. 1. The propeller shaft 73 forms part of the rear wheel driveline and is connected at its rear end to a rear-wheel final reduction and differential gear assembly 74 through a constant-velocity or universal coupling unit 75. The rear-wheel final reduction and differential gear assembly 74 has a power input member connected to the propeller shaft 73 through the coupling unit 75 and a pair of power output members connected to rear side gear shafts 76 and 76', respectively, and is adapted to produce between the input member and each of the output members a gear ratio equal to that achieved in the differential gear assembly 41 of the front-wheel drive gear unit 4. The rear side gear shafts 76 and 76' axially extend in a lateral direction of the vehicle body from the gear assembly 74 similarly to the front side gear shafts 40 and 40'. The rear side gear shafts 76 and 76' are connected at their axially outer ends to rear wheel drive shafts 77 and 77' through constant-velocity or universal coupling units 78 and 78', respectively. The rear-wheel drive shafts 77 and 77' also extend in a lateral direction of the vehicle body and are connected at their outer axial ends to the rear wheel axles for front road wheels 79 and 79' through constant-velocity or universal coupling units 80 and 80', respectively.

Description will now be made regarding the operation of the four-wheel drive system including the transaxle mechanism constructed and arranged as hereinbefore described.

When the engine 1 is in operation and the clutch unit 2 is in a coupled condition, the driving power delivered from the output shaft 1a of the engine 1 is transmitted through the clutch unit 2 to the input shaft 7 of the power transmission gear unit 3. If, under these conditions, one of the driven gears 16 to 19 on the transmission output shaft 8 is coupled to the shaft 8 through the associated synchronizer clutch assembly 22 or 23 or the reverse idler gear 21 is held in mesh with the reverse drive gear 15 and the synchronizer clutch assembly 22, the driving power carried to the transmission input shaft 7 is transmitted to the transmission output shaft 8 through the selected pair of gears on the shafts 7 and 8 or through the gears 15 and 21. The transmission output shaft 8 is, as a result, driven for rotation at a speed proportioned in the selected ratio to the rotational speed of the transmission input shaft 7. The rotation of the transmission output shaft 8 is transmitted via the transmission output gear 24 on the shaft 8 to the final reduction gear 31 on the gear housing 27 of the central differential gear assembly 25. The rotation of the final reduction gear 31 in turn is carried through the differential gear housing 27 and the pinion cross shafts 33 and 33' to the bevel pinions 32 and 32' of the differential gear assembly 25. The bevel pinions 32 and 32' of the differential gear assembly 25 are thus driven for rotation with the housing 27 and the pinion cross shafts 33 and 33' about the center axis of the front side gear shaft 40 and accordingly for rotation with respect to the gear housing 27 about the aligned center axes of the pinion cross shafts 33 and 33', respectively. The differential bevel pinions 32 and 32' in turn drive the differential side bevel gears 34 and 34' for rotation with respect to the gear housing 27 about an axis at right angles to the center axes of the pinion cross shafts 33 and 33'. The driving power transmitted from the bevel pinions 32 and 32' to the first side bevel gear 34 is further transmitted to the first hollow shaft 36 and, likewise, the driving power transmitted from the bevel pinions 32 and 32' to the second side bevel gear 34' is further transmitted to the second hollow shaft 38. The rotation of the first hollow shaft 36 is transmitted to the gear housing 42 of the differential gear assembly 41 and causes the gear housing 42 to rotate about the aligned axes of rotation of the side gear shafts 40 and 40'. On the other hand, the rotation of the second hollow shaft 38 is transmitted to the first intermediate gear 59 and through the gear 59 to the second intermediate gear 60 of the intermediate gear mechanism 58 and drives the second intermediate gear 60 for rotation about the center axis of the intermediate gear shaft 61.

If, in this instance, the annular coupling sleeve 56 on the second clutch gear 54 of the lock-up clutch assembly 52 is held in the axial position disengaged from the the first clutch gear 53 as shown in FIG. 2, the first and second clutch gears 53 and 54 are permitted to rotate with respect to each other so that the first and second hollow shafts 36 and 38 are permitted to rotate at different speeds, enabling the first and second side bevel gears 34 and 34' of the central differential gear assembly 25 to rotate at different speeds with respect to the gear housing 27. Under these conditions, driving power is transmitted from the final reduction gear 31 to the gear housing 42 of the differential gear assembly 41 through the first side bevel gear 34 of the central differential gear assembly 25, the first hollow shaft 36 and the hub member 51. If, on the other hand, the annular coupling sleeve 56 of the lock-up clutch assembly 52 is held in the axial position engaging the first clutch gear 53 on the hub member 51, the first hollow shaft 36 is locked up to the second hollow shaft 38 through the hub member 51, first clutch gear 53, coupling sleeve 56 and second clutch gear 54. The first and second clutch gears 53 and 54 and accordingly the first and second hollow shafts 36 and 38 are therefore caused to rotate as a single unit so that the first and second side bevel gears 34 and 34' of the central differential gear assembly 25 are driven for rotation at equal speeds with respect to the gear housing 27. Under these conditions, driving power is transmitted from the final reduction gear 31 to the gear housing 42 of the differential gear assembly 41 through the first and second side bevel gears 34 and 34' of the central differential gear assembly 25, the first and second hollow shafts 36 and 38, the lock-up clutch assembly 52 and the hub member 51.

The driving power transmitted from the final reduction gear 31 to the gear housing 42 of the front-wheel differential gear assembly 41 through the first hollow shaft 36 or the first and second hollow shafts 36 and 38 as above described is carried to the bevel pinions 44 and 44' of the differential gear assembly 41 through the pinion cross shaft 45 and drives the differential bevel pinions 44 and 44' for rotation with the housing 42 about the center axis of the front side gear shaft 40 and further for rotation with respect to the gear housing 42 about the center axis of the pinion cross shaft 45. The differential bevel pinions 44 and 44' in turn drive the differential side bevel gear 46 and 46' for rotation with respect to the gear housing 42 about an axis at right angles to the center axis of the pinion cross shaft 45. Thus, the driving power transmitted to the differential gear assembly 41 is split into two output components, which are transmitted to the side gear shafts 40 and 40' and further through these shafts 40 and 40', coupling units 48 and 48', front-wheel drive shafts 47 and 47' and coupling units 50 and 50' to the wheel axles of the front road wheels 49 and 49', respectively (FIG. 1).

On the other hand, the driving power transmitted to the first intermediate gear 59 of the intermediate gear mechanism 58 is carried to the second intermediate gear 60 on the intermediate gear shaft 61. If, in this instance, the coupling sleeve 66 on the second clutch gear 65 of the two-wheel/four-wheel drive shift gear assembly 63 is held in the axial position engaging the first clutch gear 64, the driving power imparted from the first intermediate gear 59 to the second intermediate gear 60 as above mentioned is transmitted to the intermediate gear shaft 61 through the first clutch gear 64, coupling sleeve 66 and second clutch gear 65 and drives the shaft 61 for rotation about the center axis thereof. The intermediate gear shaft 61 thus drives the driving bevel gear 68 of the right-angle power transfer gear mechanism 67 for rotation with the gear shaft 61, and the driving bevel gear 68 in turn drives the driven bevel gear 69 for rotation about the axis thereof in a fore-and-aft direction of the vehicle body. The driving power transmitted to the first intermediate gear 59 is, thus, carried not only to the front road wheels 49 and 49' as above described but also to the rear-wheel final reduction and differential gear assembly 74 (FIG. 1) via the coupling unit 72, propeller shaft 73 and coupling unit 75. The rear-wheel final reduction and differential gear assembly 74 splits the input driving power into two driving power components respectively driving the rear side gear shafts 76 and 76' extending from the gear assembly 74. The driving power components are further transmitted via the coupling units 78 and 78', rear-wheel drive shafts 77 and 77' and coupling units 80 and 80' to the wheel axles of the rear road wheels 79 and 79', respectively. The front road wheels 49 and 49' and the rear road wheels 79 and 79' are thus driven for rotation so that the vehicle operates in a four-wheel driven mode. If, however, the coupling sleeve 66 of the two-wheel/four-wheel drive shift gear assembly 63 is held in the axial position disengaged from the first clutch gear 64, the second clutch gear 65 and accordingly the intermediate gear shaft 61 are isolated from the driving power transmitted to the second intermediate gear 60 and are allowed to idle on the intermediate gear shaft 61. In this instance, only the front road wheels 49 and 49' are driven for rotation so that the vehicle operates in a two-wheel driven mode.

While the power unit in the four-wheel drive system embodying the power unit in the four-wheel drive system embodying the present invention has been assumed as being positioned in a front portion of the vehicle body, the power unit of a transaxle mechanism of a four-wheel drive system according to the present invention may be installed in a lengthwise middle or rear portion of the vehicle body.

Furthermore, the central differential gear assembly 25 provided in the embodiment of the present invention may be replaced with a differential gear assembly constituted by a planetary gear assembly. While, furthermore, the system embodying the present invention has been described as using the power transmission system of the manually-operated type, it will be apparent that a four-wheel drive system according to the present invention may be of the type which uses a power transmission system of the automatically-operated type.

One of the outstanding advantages of the four-wheel drive system proposed by the present invention as thus far described is that the component gears of the central differential gear assembly are incorporated into the gear housing 27 which is integral with the final reduction gear 31. Another outstanding advantage of the system proposed by the present invention is that one of the front-wheel and rear-wheel differential gear assemblies and the right-angle power transfer gear mechanism to transmit driving power to the other of the front-wheel and rear-wheel differential gear assemblies are enclosed within the auxiliary transaxle gear casing 26 detachably secured to the main transaxle gear casing 6. By virture of such arrangements, those members, units and assemblies required in a four-wheel driven vehicle such as, for example, the lock-up clutch assembly 52, front-wheel differential gear assembly and the intermediate gears 59 and 60 can be accommodated within the auxiliary transaxle gear casing 26 provided in addition to the main transaxle gear casing 6. In accordance with the present invention, a transaxle mechanism including a central differential gear assembly can thus be realized simply by modifying a transaxle mechanism of a two-wheel vehicle drive system in such a manner that the gear housing having the final reduction gear assembly for the two-wheel drive system is adapted to have accommodated therein the central differential gear assembly and that the auxiliary transaxle gear casing 26 is attached additionally to the main transaxle gear casing 6. This will contribute to significant reduction of the production cost of a transaxle mechanism for use in a four-wheel drive system having a central differential gear assembly.

What is claimed is:

1. A four-wheel drive system for a vehicle with first and second pairs of road wheels, comprising a power unit having an output shaft rotatable about an axis in a lateral direction of the vehicle;

a power transmission gear unit including transmission input and output shafts each having an axis of rotation in a lateral direction of the vehicle;

a final reduction gear rotatable about an axis parallel with the respective axes of rotation of the transmission input and output shafts, the transmission output shaft being held in driving engagement with said final reduction gear;

a main transaxle gear casing having enclosed therein said transmission gear unit and said final reduction gear;

an auxiliary transaxle gear casing secured to said main transaxle gear casing;

a central differential gear assembly enclosed within said main transaxle gear casing and including a differential gear [housing] *member* coaxially rotatable with said final reduction gear about the axis of rotation of the final reduction gear and two output members enclosed within said differential gear [housing] *member* and rotatable at different speeds about axes substantially aligned with the axis of rotation of the differential gear [housing] *member;* a first wheel drive gear unit enclosed within said auxiliary transaxle gear casing and comprising a differential gear assembly operatively connected to the first pair of road wheels of the vehicle and including an input member rotatable with one of the two output members of the central differential gear assembly about an axis in a lateral direction of the vehicle;

intermediate gear means enclosed within said auxiliary transaxle gear casing and including an input gear rotatable with the other of the two output members of the central differential gear assembly about an axis substantially aligned with the axis of rotation of the output member of the central differential gear assembly;

a second wheel drive gear unit comprising a differential gear assembly operatively connected to the second pair of road wheels of the vehicle; and right-angle power transfer gear means enclosed within said auxiliary transaxle casing and operative to transmit driving power from said intermediate gear means to the differential gear assembly of the second wheel drive gear unit in a fore-and-aft direction of the vehicle.

2. A four-wheel drive system as set forth in claim 1, in which said first wheel drive gear unit further comprises a lock-up clutch assembly operatively intervening between the two output members of said central differential gear assembly and operable for having the two output members locked up to each other and enabled to rotate at substantially equal speeds about the axis of rotation of said differential gear [housing] *member.*

3. A four-wheel drive system as set forth in claim 2, in which said lock-up clutch assembly comprises a first clutch gear rotatable with one of the two output members of said central differential gear assembly about the axis of rotation of said differential gear [housing] *member*, a second clutch gear rotatable with the other of the two output members about the axis of rotation of said differential gear [housing] *member*, and a coupling element rotatable with one of the first and second clutch gears and axially movable selectively into and out of engagement with the other of the first and second clutch gears.

4. A four-wheel drive system as set forth in claim 3, in which said lock-up clutch assembly intervenes between the differential gear assembly and the intermediate gear means of said first wheel drive gear unit.

5. A four-wheel drive system as set forth in claim 4, in which one of the first and second clutch members of said lock-up clutch assembly is coaxially rotatable with said input member of the differential gear assembly of the first wheel drive gear unit and the other of the first and second clutch members is coaxially rotatable with said input gear of said intermediate gear means.

6. A four-wheel drive system as set forth in claim 5, in which said right-angle power transfer gear means is enclosed within said auxiliary transaxle gear casing.

7. A four-wheel drive system as set forth in any one of claims 1 to 6, further comprising two-wheel/four-wheel drive gear means intervening between said intermediate gear means and said right-angle power transfer gear means and operative to selectively provide and interrupt driving connection from the intermediate gear means to the right-angle power transfer gear means.

8. A four-wheel drive system as set forth in claim 7, in which said intermediate gear means further comprises an intermediate gear shaft rotatable about an axis substantially parallel with the axis of rotation of the input gear of the intermediate gear means and an output gear coaxially rotatable on the intermediate gear shaft and held in mesh with the input gear, said intermediate gear shaft being held in driving engagement with said right-angle power transfer gear means.

9. A four-wheel drive system as set forth in claim 8, in which said two-wheel/four-wheel shift gear means comprises a first clutch member coaxially rotatable with said output gear of said intermediate gear means, a second clutch member coaxially rotatable with said intermediate gear shaft, and a coupling element rotatable with one of the first and second clutch members and axially movable selectively into and out of engagement with the other of the first and second clutch members.

10. A four-wheel drive system as set forth in claim 9, in which said right-angle power transfer gear means comprises a driving bevel gear rotatable about an axis in a lateral direction of the vehicle, and a driven bevel gear rotatable about an axis in a fore-and-aft direction of the vehicle and held in mesh with said driving bevel gear, said output gear of said intermediate gear means being drivingly engageable with said driving bevel gear through said two-wheel/four-wheel drive gear means.

* * * * *